(12) United States Patent
Tomioka et al.

(10) Patent No.: US 7,979,937 B2
(45) Date of Patent: Jul. 19, 2011

(54) BOARDING BRIDGE

(75) Inventors: Takashi Tomioka, Hiroshima (JP); Yasuaki Shimizu, Hiroshima (JP); Kenji Iwamoto, Hiroshima (JP)

(73) Assignee: Mitsubishi Heavy Industries Transportation Equipment Engineering & Service Co., Ltd., Kanagawa (JP)

( * ) Notice: Subject to any disclaimer, the term of this patent is extended or adjusted under 35 U.S.C. 154(b) by 0 days.

(21) Appl. No.: 12/510,721

(22) Filed: Jul. 28, 2009

(65) Prior Publication Data

US 2010/0162497 A1 Jul. 1, 2010

(30) Foreign Application Priority Data

Dec. 26, 2008 (JP) ................................. 2008-335165

(51) Int. Cl.
*E02D 15/00* (2006.01)
(52) U.S. Cl. ......................................... 14/71.5; 14/72.5
(58) Field of Classification Search ................. 404/71.5, 404/72.5; 180/79.2, 411; 14/71.5, 72.5
See application file for complete search history.

(56) References Cited

U.S. PATENT DOCUMENTS

| | | | | |
|---|---|---|---|---|
| 3,123,167 A * | 3/1964 | Lichti | ............................ | 180/6.5 |
| 3,462,784 A * | 8/1969 | Seipos | ............................ | 14/71.5 |
| 3,462,787 A * | 8/1969 | Seipos | ............................ | 14/71.5 |
| 3,532,178 A * | 10/1970 | Lindbom | ...................... | 180/411 |
| 3,577,838 A * | 5/1971 | Van Marle | ...................... | 14/71.5 |
| 3,696,881 A * | 10/1972 | Gordon | ......................... | 180/411 |
| 3,933,218 A * | 1/1976 | Oler et al. | .................. | 180/411 |
| 4,229,649 A * | 10/1980 | Hawkins et al. | ............. | 250/215 |
| 4,318,098 A * | 3/1982 | McGreevy | .................... | 345/111 |
| 4,318,198 A * | 3/1982 | Drozd | ........................... | 14/71.5 |
| 5,004,188 A * | 4/1991 | Donneky et al. | ............ | 244/137.2 |
| 5,855,035 A * | 1/1999 | Streeter et al. | ................ | 14/71.5 |
| 6,125,963 A * | 10/2000 | Staiger | ......................... | 180/411 |
| 7,743,445 B2 * | 6/2010 | Shen et al. | .................... | 14/71.5 |
| 2008/0319621 A1 * | 12/2008 | Xiang | ............................ | 701/69 |

FOREIGN PATENT DOCUMENTS

| | | |
|---|---|---|
| JP | 2004082833 A | 3/2004 |
| JP | 2006182060 A | 7/2006 |

* cited by examiner

*Primary Examiner* — Raymond W Addie
(74) *Attorney, Agent, or Firm* — Pearne & Gordon LLP

(57) ABSTRACT

It is an object to provide a boarding bridge that can guide passengers to a predetermined gangway at the distal end and in which safety can be improved. A boarding bridge is provided which includes a proximal-end tunnel and a distal-end tunnel telescopically fitted together and capable of relative movement in a longitudinal direction; and a traveling unit mounted at the lower part of a movable leg that supports the distal-end tunnel and moving the movable leg by traveling; wherein the traveling unit includes a pair of traveling devices disposed with a certain distance therebetween in the widthwise direction of the distal-end tunnel, the traveling devices each having an axle rotatable about a vertically extending axis, a plurality of tires rotatably mounted to the axle with a certain distance therebetween, and a traveling motor that rotationally drives the axle; and a rotation synchronizing member that synchronizes the rotation angles of the axles in the pair of traveling devices.

3 Claims, 4 Drawing Sheets

BOARDING BRIDGE

BACKGROUND OF THE INVENTION

1. Field of the Invention

The present invention relates to a boarding bridge for use in boarding and alighting of passengers on airplanes etc.

2. Description of Related Art

Boarding bridges are tunnel-shaped walkways that connect, for example, an airport terminal building and an airplane, to allow direct boarding and alighting of passengers between the terminal building and the airplane.

The intermediate gangway portion of a boarding bridge is constituted by a plurality of telescopically fitted gangway units and extends and contracts by the relative movement of the gangway units in the longitudinal direction. A gangway unit at the distal end is supported by a movable leg equipped with a traveling unit at the lower part. The movable leg travels by means of the traveling unit, so that the intermediate gangway portion extends and contracts or swings about the terminal building side.

Doing so copes with the gap between the terminal building and the airplane or a difference in positional relationship therebetween.

The traveling unit is generally mounted below a horizontally extending support beam provided at the lower part of the movable leg.

As shown in Japanese Unexamined Patent Application, Publication No. 2004-82833, for example, the traveling unit is provided with a rotating table at the center of the support beam (lateral member) so as to rotate about the vertical axis. The rotating table is equipped with an axle mounted at the lower part with a pin and right and left wheels that are rotatably mounted at the ends of the axle. The right and left wheels are configured to be independently rotationally driven via separate driving motors and reducing gears.

This supports only the widthwise central portion; the interval between the right and left wheels is narrow; and the axle is attached to the rotating table with the pin. Therefore, it has problems of low stability in response to a widthwise external force that acts on the boarding bridge, so that the boarding bridge is prone to sway.

To solve these problems, for example, a traveling unit shown in Japanese Unexamined Patent Application, Publication No. 2006-182060 is proposed.

It is provided with support frames that are rotatable about the vertical axis at the lower parts of both ends of the support beam. A horizontally extending axle to which a wheel is fixed is rotatably supported by each support frame. A traveling motor is connected to the extending portion of the axle. Thus, when the traveling motor is driven, the driving wheel rotates about the horizontal axis through the axle and travels. The support frames at both sides are configured to be individually rotated about the vertical axis by the separate motors.

Since the interval between the wheels is substantially equal to the length of the support beam, a long interval between the wheels can be ensured as compared with that of Japanese Unexamined Patent Application, Publication No. 2004-82833. Accordingly, the stability of the boarding bridge can be improved.

The disclosures in Japanese Unexamined Patent Application, Publication No. 2004-82833 and Japanese Unexamined Patent Application, Publication No. 2006-182060 support loads with two wheels. Therefore, the wheels need to be large to carry a heavy load for a heavy-load (for example, long) boarding bridge, which results in high costs.

Moreover, there is a limitation to increasing the size of the wheels, which leads to limiting conditions for manufacturing a very large (for example, very long) boarding bridge.

With the disclosure in Japanese Unexamined Patent Application, Publication No. 2006-182060, the support frames that change the directions of the wheels are separately and independently driven by the separate motors. Therefore, this needs advanced, complicated control to set the rotating angles thereof to appropriate values, and because the driving units are mounted to the each wheel the costs are increased.

BRIEF SUMMARY OF THE INVENTION

In consideration of the above problems, it is an object of the present invention to provide a boarding bridge which can cope with an increase in size while being capable of using small wheels, which can easily be operated, and which has improved stability.

To solve the above problems, the present invention adopts the following solutions.

An aspect of the present invention is a boarding bridge including a plurality of gangway units telescopically fitted together and capable of relative movement in a longitudinal direction; and a traveling unit mounted at the lower part of a supporting member that supports the gangway unit at the distal end and moving the supporting member by traveling; wherein the traveling unit includes a pair of traveling devices disposed with a certain distance therebetween in the widthwise direction of the gangway unit, the traveling devices each having an axle rotatable about a vertically extending axis, a plurality of wheels rotatably mounted to the axle with a certain distance therebetween, and a driving member that rotationally drives the axle; and a synchronizing member that synchronizes the rotation angles of the axles of the pair of traveling devices.

According to this aspect, since the pair of traveling devices each provided with the plurality of wheels are disposed with a certain distance therebetween in the widthwise direction, the distal end of the boarding bridge is supported by at least four wheels. Accordingly, a load imposed on one wheel becomes half or less of that of the conventional structure supported by two wheels, which means that relatively small wheels can be used.

This can reduce the cost of manufacturing the wheels, which increases geometrically. Moreover, this can prevent the wheels from becoming limiting conditions in manufacturing a very large (for example, very long) boarding bridge.

Furthermore, the boarding bridge is supported by the wheels that are provided at four or more locations with a certain distance therebetween in the widthwise direction, which reduces the tendency to swing due to a widthwise external force acting on the boarding bridge, thereby improving the stability.

Since the synchronizing member that synchronizes the rotation angles of the axles of the pair of traveling devices is provided, the traveling directions of the wheels of both the traveling devices can be made equal by the synchronizing member. Accordingly, since this eliminates advanced and complicated control for the operation of the boarding bridge, the boarding bridge can be manufactured at correspondingly low cost and can easily be operated.

In the above aspect, it is preferable that the synchronizing member be configured to integrally connect the rotating parts of the individual axles.

When the rotating parts of the individual axles are integrally connected in this way, both the rotating parts are integrally operated, that is, rotated, so that the rotation angles of the individual axles, that is, the traveling directions of the wheels, can be synchronized easily and accurately.

In the above aspect, it is preferable that the synchronizing member include sprockets mounted to the rotating parts of the individual axles and a chain winding between the sprockets.

With this configuration, the sprockets mounted to the rotating parts of both of the axles rotate by the moving amount of the chain, so that the sprockets mounted to the rotating parts of the axles are rotated by the same amount.

In other words, since the rotation amounts of the rotating parts are determined by the chain, the rotation amounts of both of the rotating parts, that is, the traveling directions of the wheels, can be synchronized easily and accurately.

In the above aspect, it is preferable that a stopping member for stopping the movement of the chain be provided.

Since the stopping member for stopping the movement of the chain is provided in this way, when the movement of the chain is stopped by the stopping member, the rotating parts of the axles can be fixed so as not to rotate. For example, activating the stopping member after determining the traveling direction eliminates the wobble of the wheels, allowing stable traveling. This is particularly effective when traveling some long distance in a fixed direction, such as in traveling straight ahead.

According to the present invention, the pair of traveling devices each provided with the plurality of wheels are disposed with a certain distance therebetween in the widthwise direction. Therefore, this can reduce the cost of manufacturing the wheels and can prevent the wheels from becoming limiting conditions in manufacturing a very large (for example, very long) boarding bridge.

Moreover, the boarding bridge is supported by the wheels disposed with a certain distance therebetween in the widthwise direction, which reduces the tendency to swing due to a widthwise external force acting on the boarding bridge, thereby improving the stability.

Furthermore, since the synchronizing member that synchronizes the rotation angles of the axles of the pair of traveling devices is provided, the boarding bridge can be manufactured at low cost and can easily be operated.

DETAILED DESCRIPTION OF THE INVENTION

An embodiment of the present invention will be described below with reference to FIGS. 1 to 4, taking as an example a boarding bridge 1 in which an extending and contracting tunnel portion is constituted of two tunnels.

Figure 1:
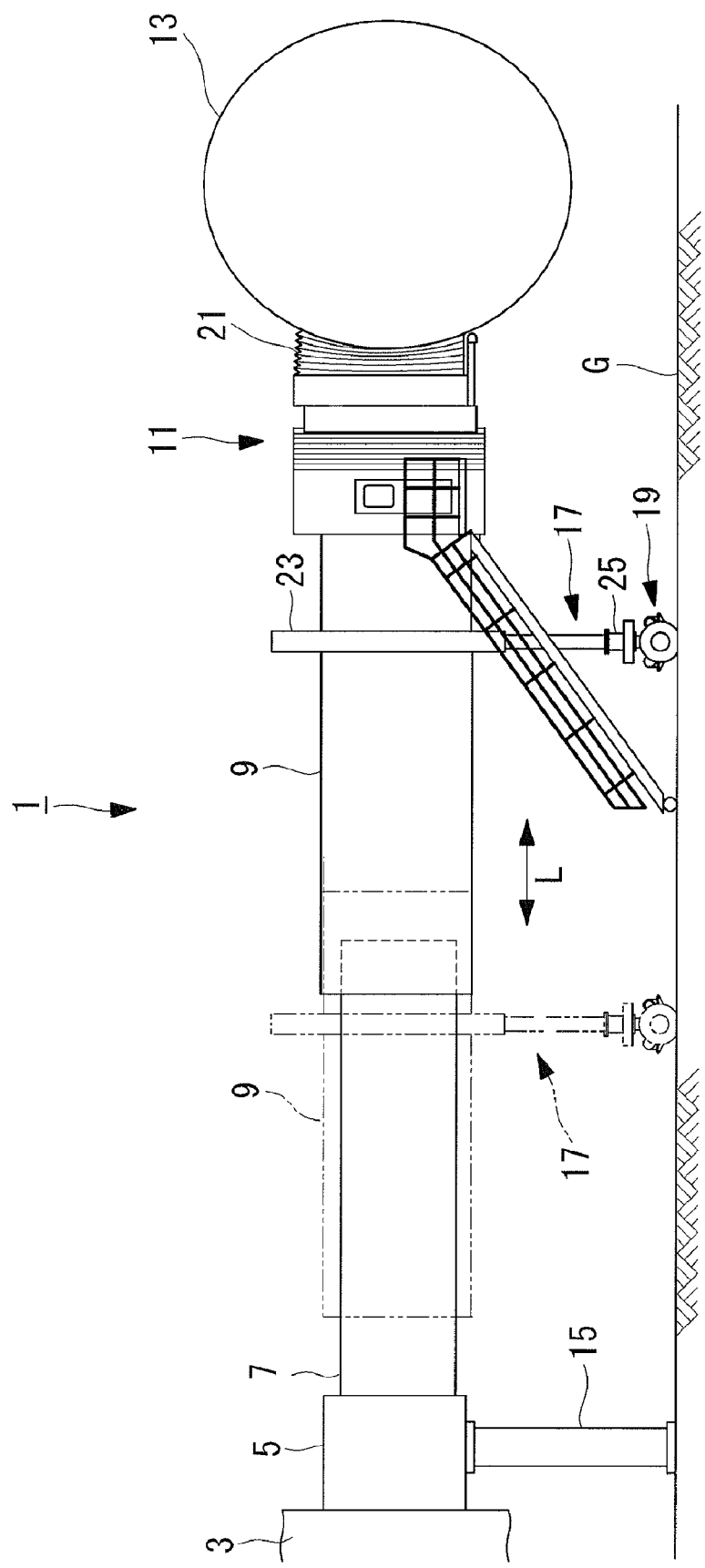
FIG. 1 is a side view showing the overall schematic configuration of a boarding bridge according to an embodiment of the present invention.

FIG. 1 is a side view showing the overall schematic configuration of the boarding bridge 1.

The boarding bridge 1 connects an airport terminal building and an airplane 13 to form a passenger gangway between the terminal building and the airplane 13 to allow direct boarding and alighting.

The boarding bridge 1 is provided with a rotunda 5 connected to a fixed bridge 3 communicating with the terminal building, a proximal-end tunnel 7 connected to the rotunda 5, a distal-end tunnel 9 telescopically fitted on the distal end of the proximal-end tunnel 7, and a head 11 provided at the distal end of the distal-end tunnel 9 and connected to the airplane 13.

The boarding bridge 1 is configured so as to swing vertically and laterally about the rotunda 5.

A fixed leg 15 that is fixed to the ground G is provided under the rotunda 5. A movable leg (supporting member) 17 is provided at the distal end of the distal-end tunnel 9 in a longitudinal direction L. A traveling unit 19 capable of traveling along the ground G in a desired direction is mounted at the lower part of the movable leg 17.

The boarding bridge 1 is supported by the fixed leg 15 and the movable leg 17.

The proximal-end tunnel 7 and the distal-end tunnel 9 are each shaped like a hollow rectangular bar. The proximal-end tunnel 7 and the distal-end tunnel 9 are formed in a tubular shape by disposing steel structural beams on the individual sides of a quadrangular bar and mounting panels, made of an aluminum alloy, for example, to both side surfaces and the top and bottom surfaces so as to connect the structural beams. The panels may be formed of plastic, a transparent material (plastic, glass, etc.), or the like.

The cross-sectional area of the hollow portion of the distal-end tunnel 9 is configured to be larger than the cross-sectional area of the proximal-end tunnel 7. The hollow portion of the distal-end tunnel 9 is configured to guide the outer peripheral surface of the proximal-end tunnel 7.

Since the movable leg 17 moves as the traveling unit 19 travels, the distal-end tunnel 9 moves together therewith.

For example, when the traveling unit 19 travels in the longitudinal direction L, the movable leg 17 moves in the longitudinal direction L. Along with this, the distal-end tunnel 9 supported by the movable leg 17 moves in the longitudinal direction L to change the length of engagement with the proximal-end tunnel 7, so that the boarding bridge 1 can be extended or contracted. This extension and contraction accommodates the interval between the rotunda 5 and the airplane 13. When the traveling unit 19 travels in a direction crossing the longitudinal direction L, the boarding bridge 1 swings about the rotunda 5 on the ground G, to allow accommodation of a difference in positional relationship between the terminal building and the airplane 13.

A connecting part 21 to be connected to the entrance of the airplane 13 is provided at the distal end of the head 11.

A gangway through which passengers pass is provided from the rotunda 5 to the head 11.

Figure 2:
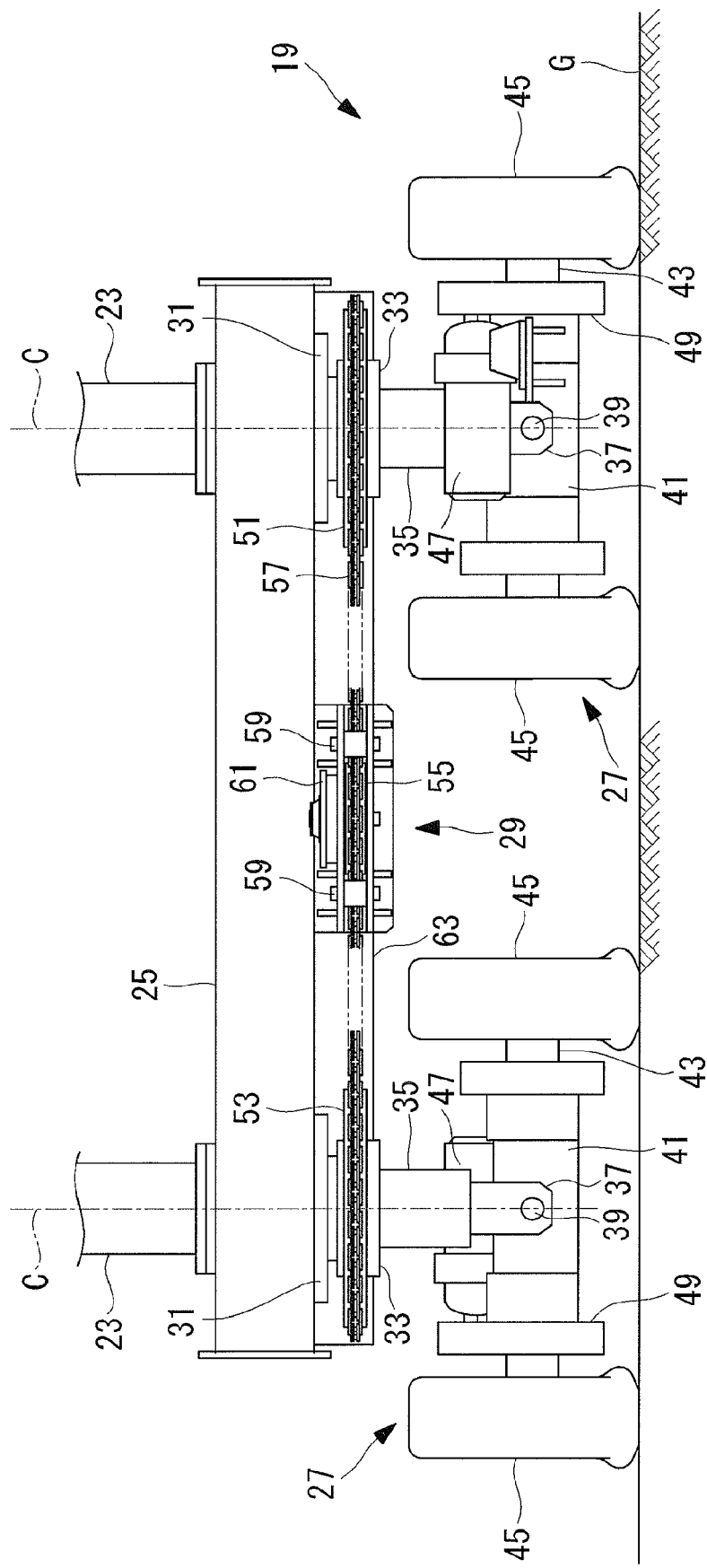
FIG. 2 is a front view showing the overall schematic configuration of a traveling unit according to an embodiment of the present invention.
Figure 3:
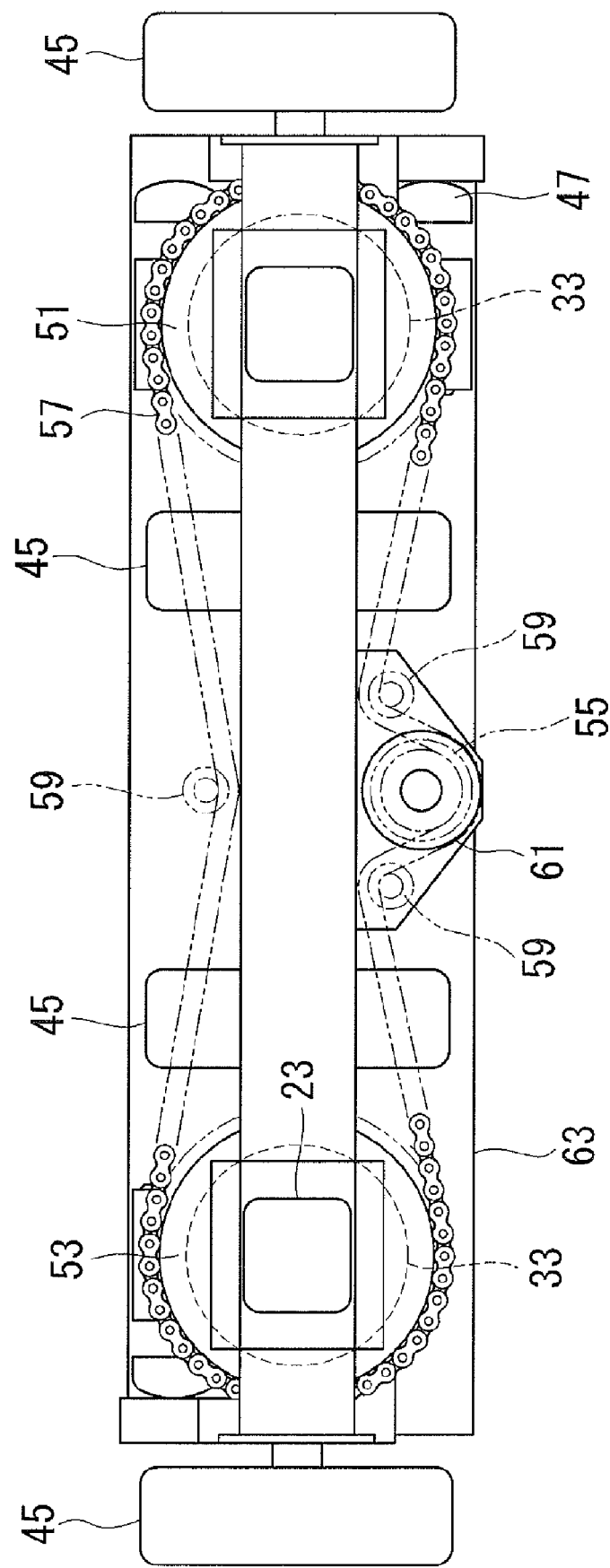
FIG. 3 is a plan view showing the overall schematic configuration of the traveling unit according to the embodiment of the present invention.
Figure 4:
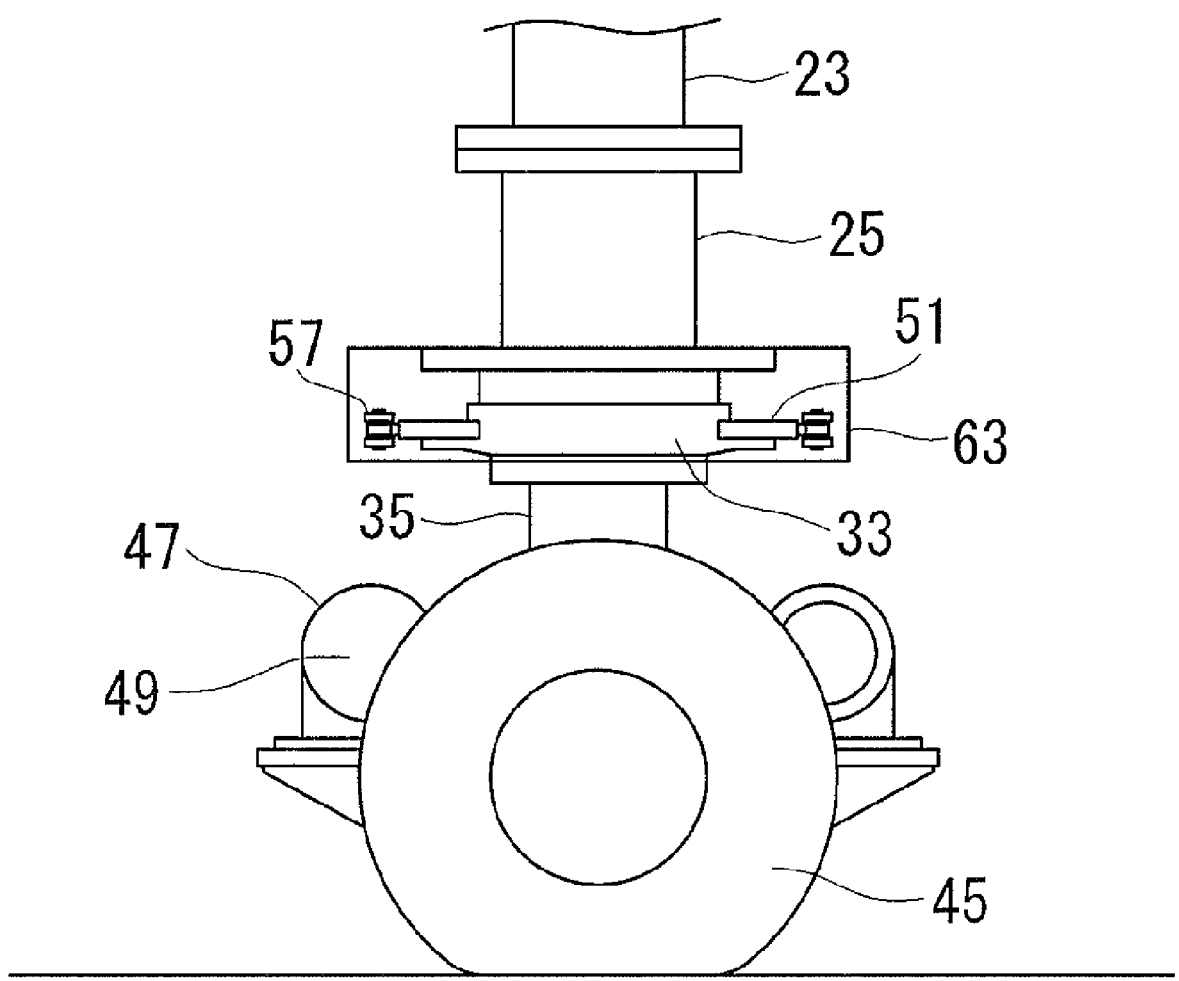
FIG. 4 is a side view showing the overall schematic configuration of the traveling unit according to the embodiment of the present invention.

FIG. 2 is a front view showing the overall schematic configuration of the traveling unit 19. FIG. 3 is a plan view of FIG. 2. FIG. 4 is a side view of FIG. 2.

The movable leg 17 is provided with a pair of right and left support columns 23 mounted to both sides of the distal-end tunnel 9 and extending in the vertical direction.

The support columns 23 have a structure in which hollow columnar members having a rectangular cross section are fitted to each other so as to be movable in the direction of an axis C. The upper columnar member is moved along the axis C by a driving means (not shown), so that the support column 23 extends and contracts. Thus, the height position of the distal-end tunnel 9 from the ground G changes.

A support beam 25 that extends horizontally is fixedly mounted to the lower ends of the pair of support columns 23 so as to join them.

The support beam 25 is a hollow columnar member having a rectangular cross section. The cross sections of the support columns 23 and the support beam 25 are not limited to the rectangular shape and may be another shape such as a substantially circular shape.

The traveling unit 19 is equipped with a pair of traveling devices 27 mounted at extended positions of the support columns 23, below the support beam 25, and a rotation synchronizing unit (synchronizing member) 29 that synchronize the traveling directions, that is, the rotation angles, of the pair of traveling devices 27.

Each of the traveling devices 27 is equipped with a support plate 31 fixed to the lower part of the support beam 25, a rotating part 33 that is supported by the support plate 31 so as to be rotatable about the axis C (vertically extending axis), a connecting part 35 that is fixedly mounted under the rotating part 33, a pair of connecting plates 37 fixedly mounted to the lower part of the connecting part 35 so as to project therefrom, an axle retaining unit 41 that is mounted between the pair of connecting plates 37 with a pin 39 disposed so as to be substantially perpendicular to the axis C, an axle 43 that is rotatably supported by the axle retaining unit 41, two rubber tires (wheels) 45 that are individually fixedly mounted to both ends of the axle 43, and a traveling motor (driving member) 47 with a reduction gear, which traveling motor is mounted to the axle retaining unit 41, for rotationally driving the axle 43.

As the tires 45 on both sides come into contact with the ground G, the axle 43 and the axle retaining unit 41 are extended substantially in the horizontal direction. The axle retaining unit 41 is mounted to the connecting plates 37 with the pin 39. The rotating part 33 has a substantially cylindrical form, and its axial center is aligned with the axis C. The rotating part 33 is rotationally driven by a driving member (not shown) about the axis C. The rotating action of the rotating part 33 is transmitted to the axle retaining unit 41 through the connecting part 35 and the connecting plates 37 to rotate the axle retaining unit 41 about the axis C. This rotates the axle 43 about the axis C, thus changing the traveling direction of the tires 45.

Since the two tires 45 are mounted to each of the pair of traveling devices 27 in this way, the distal-end tunnel 9, that is, the boarding bridge 1, is supported by four of the tires 45. Accordingly, a load imposed on one tire 45 becomes half or less of that of a conventional structure supported by two wheels, which can reduce the size of the wheels correspondingly.

This can reduce the cost of manufacturing the tires 45, which increases geometrically. Moreover, this reduces the need for increasing the size of the tires 45 so that they become difficult to manufacture, which prevents the tires 45 from becoming limiting conditions in manufacturing a very large (for example, very long) boarding bridge 1.

Furthermore, the boarding bridge 1 is supported by the tires 45 provided at four locations with a certain distance therebetween in the widthwise direction, which reduces the tendency to swing due to a widthwise external force acting on the boarding bridge 1, thereby improving the stability.

In this embodiment, the tires 45 on the outside of the individual traveling devices 27 are disposed farther outward than the support columns 23, which increases their support areas, thus further increasing the stability.

The traveling motor 47 transmits a driving force to the axle 43 through driving boxes 49. That is, a sprocket (not shown) is mounted to the rotation shaft of the traveling motor 47, and a sprocket (not shown) is mounted to the axle 43, around which a chain is wound.

Thus, when the traveling motor 47 is driven, the axle 43 is rotationally driven via the chain, so that the two tires 45 rotate about the horizontal axis. As a result, the traveling device 27 travels.

The rotation synchronizing unit 29 is mounted under the support beam 25.

The rotation synchronizing unit 29 is equipped with rotating sprockets (sprockets) 51 and 53 that are coaxially fixed to the outer circumferences of the individual rotating parts 33, an intermediate sprocket 55 that is disposed at a substantially central position between the rotating sprockets 51 and 53, a rotation synchronizing chain (chain) 57 that winds around these sprockets, a plurality of guide sprockets 59 that guide the rotation synchronizing chain 57, a brake (stopping member) 61 that selectively stops the rotation of the intermediate sprocket 55, and a cover 63 that covers them.

The rotating sprockets 51 and 53, the intermediate sprocket 55, and the guide sprockets 59 are disposed so that their axial centers are substantially parallel to the axis C.

The guide sprockets 59 are disposed at positions where the rotation synchronizing chain 57 becomes taut by application of tension.

The brake 61 has a friction member (not shown) that selectively engages with the rotation shaft of the intermediate sprocket 55 and operates the friction member to enable or disable the intermediate sprocket 55 to rotate.

Since the rotation synchronizing chain 57 is wound around the rotating sprockets 51 and 53 that are fixed to the rotating parts 33 of the individual traveling devices 27 in this way, the rotating parts 33 of the individual traveling devices 27 are integrally connected with the rotation synchronizing chain 57.

In other words, since the rotating sprockets 51 and 53 mounted to the rotating parts 33 rotate by the moving amount of the rotation synchronizing chain 57, the rotating sprockets 51 and 53 are rotated by the same amount.

Since the rotation amounts of the rotating parts 33 are determined by the rotation synchronizing chain 57 in this way, the rotation amounts of both of the rotating parts 33, that is, the traveling directions of the wheels 45, can be synchronized easily and accurately.

In this embodiment, the rotation synchronizing unit 29 connects both of the rotating parts 33 with the rotation synchronizing chain 57; however, it is not limited thereto.

For example, arms fixed to both of the rotating parts 33 may be connected with a link, or alternatively, may be connected with a gear, a belt, etc.

The operation of the above-described boarding bridge 1 according to this embodiment will be described.

The boarding bridge 1 stands by in a state in which the distal-end tunnel 9 is fitted on the proximal-end tunnel 7 by a large amount, that is, in an contracted state, as indicated by the two-dot chain line in FIG. 1.

When the airplane 13 arrives, the traveling unit 19 is operated to extend or contract the boarding bridge 1, or to swing it about the rotunda 5 so that the connecting part 21 of the head 11 can connect with the entrance of the airplane 13.

An operator performs operations such as rotating the rotating parts 33 and controlling the driving of the traveling motors 47 of the traveling devices 27 with control equipment disposed at the head 11 while viewing the entrance of the airplane 13, to manipulate the boarding bridge 1 to a position where the connecting part 21 of the head 11 can connect with the entrance of the airplane 13.

At that time, since the rotation amounts of the rotating parts 33 of the individual traveling devices 27 are determined by the rotation synchronizing chain 57, the rotation amount of the rotating parts 33 of the pair of traveling devices 27, that is, the traveling directions of the tires 45, can be synchronized easily and accurately.

Accordingly, this eliminates advanced and complicated control for the operation of the boarding bridge 1, so that the boarding bridge 1 can be manufactured at correspondingly low cost and can easily be operated.

When the boarding bridge 1 is operated, the boarding bridge 1 is sometimes swung around the rotunda 5 until the entrance to be connected to becomes located on the extension of the boarding bridge 1 in the longitudinal direction L, and thereafter, the tires 45 are moved straight ahead until the connecting part 21 of the head 11 reaches the entrance of the airplane 13.

At that time, after the rotating parts 33 are operated to set the tires 45 to move straight ahead, the brake 61 is activated to prevent the intermediate sprocket 55 from rotating.

If the intermediate sprocket 55 does not rotate, the rotation synchronizing chain 57 cannot move, so that the rotating parts 33 cannot rotate.

If the rotating parts 33 cannot rotate, the directions of the tires 45 do not change even if a biasing force acts on the tires 45 etc. while traveling straight ahead. That is, this eliminates wobble of the tires 45, allowing stable traveling.

Thus, activating the brake 61 to stop the movement of the rotation synchronizing chain 57 allows the traveling directions of the tires 45 to be maintained fixed. This is effective in stable traveling when traveling some long distance in a fixed direction.

When the head 11 approaches the entrance of the airplane 13, and the connecting part 21 reaches a predetermined position opposing the entrance, the extension and movement of the boarding bridge 1 are stopped.

Next, an operation for connecting the connecting part 21 of the head 11 and the entrance of the airplane 13 is performed.

The present invention is not limited to the above-described embodiment; various modifications can be made as appropriate without departing from the spirit thereof.

What is claimed is:

1. A boarding bridge comprising:
   a plurality of gangway units telescopically fitted together and capable of relative movement in a longitudinal direction; and
   a traveling unit mounted at the lower part of a supporting member that supports the gangway unit at the distal end and moving the supporting member by traveling; wherein the traveling unit includes:
   a pair of traveling devices disposed with a certain distance therebetween in the widthwise direction of the gangway unit, the traveling devices each having an axle rotatable about a vertically extending axis, a plurality of wheels rotatably mounted to the axle with a certain distance therebetween, and a driving member that rotationally drives the axle; and
   a synchronizing member that synchronizes traveling directions of the pair of traveling devices, wherein the synchronizing member includes:
   a pair of rotating sprockets each mounted to each of the rotating parts of the axles,
   an intermediate sprocket that is disposed at a substantially central position between the pair of the rotating sprockets,
   a chain winding around the rotating sprockets and the intermediate sprocket,
   a plurality of guide sprockets that guide the chain, and
   a stopping member that selectively engages with a rotation shaft of the intermediate sprocket and stops the movement of the chain.

2. The boarding bridge according to claim 1, wherein the synchronizing member is configured to integrally connect the rotating parts of the individual axles.

3. The boarding bridge according to claim 1, each of the traveling devices having a rotating part that is rotatable with the axle as one about the vertically extending axis, the synchronizing member is configured to integrally connect the rotating parts.

* * * * *